United States Patent
Huang et al.

(10) Patent No.: US 10,122,257 B2
(45) Date of Patent: Nov. 6, 2018

(54) RIPPLE SUPPRESSION METHOD, CIRCUIT AND LOAD DRIVING CIRCUIT THEREOF

(71) Applicant: Silergy Semiconductor Technology (Hangzhou) LTD, Hangzhou, ZheJiang Province (CN)

(72) Inventors: Qiukai Huang, Hangzhou (CN); Jian Deng, Hangzhou (CN)

(73) Assignee: Silergy Semiconductor Technology (Hangzhou) LTD, Hangzhou (CN)

(*) Notice: Subject to any disclaimer, the term of this patent is extended or adjusted under 35 U.S.C. 154(b) by 0 days.

(21) Appl. No.: 15/649,828

(22) Filed: Jul. 14, 2017

(65) Prior Publication Data

US 2018/0026521 A1 Jan. 25, 2018

(30) Foreign Application Priority Data

Jul. 22, 2016 (CN) .......................... 2016 1 0587026

(51) Int. Cl.
  *H02M 1/14* (2006.01)
  *G05F 1/56* (2006.01)
  *H05B 33/08* (2006.01)

(52) U.S. Cl.
  CPC ................ *H02M 1/14* (2013.01); *G05F 1/56* (2013.01); *H05B 33/089* (2013.01); *H05B 33/0815* (2013.01); *H05B 33/0824* (2013.01)

(58) Field of Classification Search
  CPC .. H02M 1/14; H02M 1/15; G05F 1/56; G05F 1/565; H05B 33/0815; H05B 33/0824; H05B 33/089

USPC ...................... 323/266, 285, 290; 363/39, 46
See application file for complete search history.

(56) References Cited

U.S. PATENT DOCUMENTS

| | | | |
|---|---|---|---|
| 5,668,464 A * | 9/1997 | Krein ....................... | G05F 1/565 323/259 |
| 6,026,126 A * | 2/2000 | Gaetano .............. | H04L 25/4902 330/10 |
| 6,570,368 B2 | 5/2003 | Demizu | |
| 7,538,535 B2 * | 5/2009 | McDonald ............ | H02M 1/143 323/286 |
| 8,885,376 B2 * | 11/2014 | Meehan ..................... | G05F 1/10 327/290 |
| 9,564,795 B2 | 2/2017 | Jin et al. | |
| 2014/0176017 A1 | 6/2014 | Kuang et al. | |
| 2015/0123568 A1* | 5/2015 | Yang .................. | H05B 33/0812 315/297 |
| 2015/0326105 A1* | 11/2015 | Pan ....................... | H02M 1/143 363/21.12 |
| 2017/0181234 A1 | 6/2017 | Huang et al. | |
| 2017/0250620 A1* | 8/2017 | White, Jr. ............... | H02M 7/06 |
| 2018/0131267 A1* | 5/2018 | Limjoco ............... | H02M 1/143 |

* cited by examiner

*Primary Examiner* — Matthew Nguyen
(74) *Attorney, Agent, or Firm* — Michael C. Stephens, Jr.

(57) ABSTRACT

A method of suppressing ripple can include: (i) coupling a switching converter and a load in series between output terminals of a signal source; and (ii) controlling a difference voltage between an input voltage signal and an output voltage signal of the switching converter to vary with a voltage signal generated by the signal source to maintain a load current signal flowing through the load as a DC signal.

19 Claims, 10 Drawing Sheets

US 10,122,257 B2

RIPPLE SUPPRESSION METHOD, CIRCUIT AND LOAD DRIVING CIRCUIT THEREOF

RELATED APPLICATIONS

This application claims the benefit of Chinese Patent Application No. 201610587026.X, filed on Jul. 22, 2016, which is incorporated herein by reference in its entirety.

FIELD OF THE INVENTION

The present invention generally relates to the field of power electronics, and more particularly to ripple suppression methods and circuits, and associated load driving circuits.

BACKGROUND

When a switching power supply with power frequency ripples, or a frequency that is lower than a power frequency in an output current and an output voltage, is configured to drive a light-emitting diode (LED) load, flicker can occur on the LED load. In one example switching power supply, a large electrolytic capacitor may be used to store energy in order to provide a DC voltage to an LED load to decrease the output current ripple. However, power factor correction (PFC) may not be achieved in such an approach, and the service life may be decreased due to the electrolytic capacitor.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
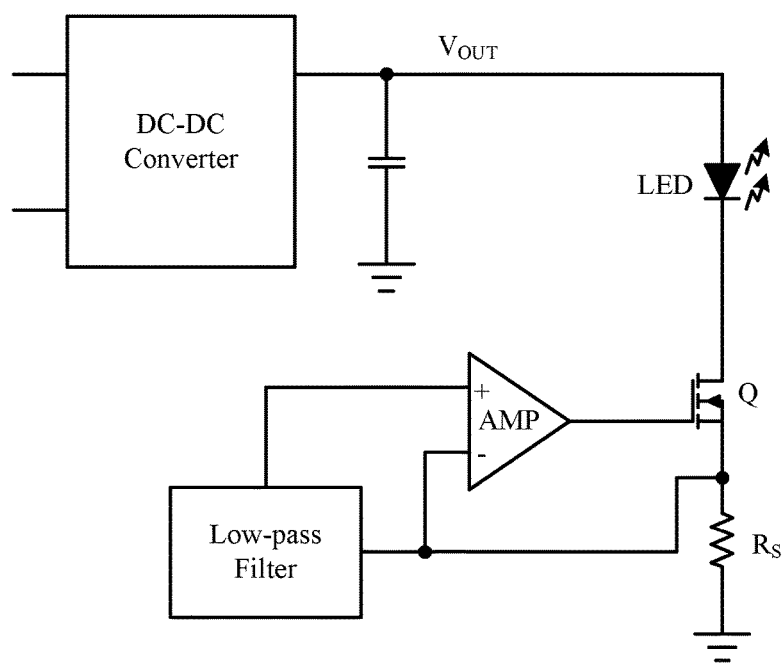
FIG. 1 is a schematic block diagram of an example LED driving circuit with a ripple suppression circuit.

Referring now to FIG. 1, shown is a schematic block diagram of an example light-emitting diode (LED) driving circuit with a ripple suppression circuit. To avoid the use of a relatively large electrolytic capacitor, a ripple suppression circuit can be employed in an LED driving circuit. The ripple suppression circuit can include transistor Q, a low-pass filter, and error operational amplifier AMP. A current flowing through an LED string may be sampled by sampling resistor Rs, which may then be filtered by a low-pass filter to obtain an average current. A gate voltage of transistor Q can be controlled in accordance with an error between the average current and the sampling current obtained by sampling resistor Rs. This can control a drain voltage of transistor Q to follow the variation of the output voltage ripple of a DC-DC converter, where the source of transistor Q may be coupled to ground. Therefore, the current flowing through the LED string may be controlled to be a DC current. However, when this approach is used, power losses of the transistor may be increased, so the requirement on the heat dissipation performance can be increased. As a result, transistors with larger sizes may be needed to improve the heat dissipation performance.

In particular embodiments, ripple suppression can include suppression of ripples generated by a source signal, in order to maintain a current signal flowing through a load to be a DC signal during the period of powering a load. The load can be configured as an LED load, and the source signal may be an AC power signal. The AC power signal may be converted to a DC voltage and a driving current to the LED load by an AC-DC power converter. The brightness of the LED load can be determined by the driving current. To avoid the flicker of the LED load, the driving current should be a DC current. However, the output voltage of the AC-DC power converter may not be a pure DC voltage, but can include ripple components in some cases. Therefore, the driving current flowing through the LED load may also include ripple components. In certain embodiments, the ripple components of the driving current can be substantially suppressed.

In particular embodiments, ripple suppression can include coupling a switching converter and an LED lamp in series between two output terminals of an AC-DC switching power supply. The ripple suppression can also include controlling a difference voltage between an input voltage signal and an output voltage signal of the switching power converter to follow the variation of a voltage signal generated by the AC-DC switching power supply, in order to maintain a load current flowing through the LED lamp to be a DC signal.

In this example AC-DC switching power supply, the switching converter and the LED lamp may form a circuit loop, and the current of the circuit loop can be the load current flowing through the LED lamp. When the difference voltage between the input voltage signal and the output voltage signal of the switching converter follows the variation of the voltage signal of the AC-DC switching power supply, the voltage across the LED lamp can be maintained to be a DC signal. Therefore, the load current flowing through the LED lamp can be controlled to be a DC signal in order to avoid the flicker of the LED lamp. Furthermore, the positive value and negative value of the difference voltage between the input voltage signal and the output voltage signal of the switching converter can be offset in order to make the average value of the difference voltage be substantially zero. Therefore, no extra power may be consumed by the switching converter, and the average value of the voltage signal may not be increased, as compared to other approaches.

In particular embodiments, the difference voltage can be made to follow the variation of the voltage signal. When the voltage signal of the AC-DC switching power supply is relatively large (e.g., the voltage signal is greater than a predetermined signal), the load current signal may be greater than a reference current signal, and a portion of the output energy can be stored by the switching convert in order to decrease the load current signal. When the output energy of the AC-DC switching power supply is relatively small (e.g., the voltage signal is not greater than the predetermined signal), the load current signal may not be greater than the reference current signal, and both the switching convert and the AC-DC switching power supply can be configured to provide energy to the LED load in order to increase the load current signal. For example, the predetermined signal can be configured as the output voltage generated by the AC-DC switching power supply operated in an ideal state when the LED lamp is in a normal operation. The predetermined signal can be configured as an average value of the voltage signal when the load is substantially constant, and the reference current signal can be configured as a representative signal of the load current.

Because the relationship between the voltage signal and the predetermined signal can correspond to the relationship between the load current signal and the reference current signal, the relationship between the voltage signal and the predetermined signal can be determined by detecting the load current signal, in order to control the operation of the switching converter. For example, when the load current is greater than the reference current signal, this can indicate that the voltage signal is greater than the predetermined signal. The amount of energy stored by the switching converter may be controlled to follow the variation of the difference between the load current signal and the reference current signal. More energy can be stored by the switching converter from the output energy of the AC-DC switching power supply when the difference between the load current signal and the reference current signal is greater. Thus, the power supplied to the LED lamp can be decreased, and the load current signal may be decreased to the reference current signal as quickly as possible.

When the load current is not greater than the reference current signal, this can indicate that the voltage signal is not greater than the predetermined signal. The amount of energy released by the switching converter may be controlled to follow the variation of the difference between the load current signal and the reference current signal. More energy can be released by the switching converter from the output energy of the AC-DC switching power supply when the difference between the load current signal and the reference current signal is greater. Thus, the power supplied to the LED lamp may be increased, and the load current signal can be increased to the reference current signal as quickly as possible.

In order to make the input voltage signal and the output voltage signal of the switching converter vary within a certain range such that the difference voltage between the signals can follow the variation of the voltage signal with greater variation range, one of the input voltage signal and output voltage signal can be configured as a "first" voltage signal. Also, the reference current signal may be regulated in accordance with the first voltage signal and a reference voltage signal. For example, when the first voltage signal is greater than the reference voltage signal, the increasing rate of the reference current signal may be controlled to follow the variation of the different voltage between the reference voltage signal and the first voltage signal. Also, when the first voltage signal is not greater than the reference voltage signal, the decreasing rate of the reference current signal may be controlled to follow the variation of the different voltage between the reference voltage signal and the first voltage signal.

In particular embodiments, an input terminal of the switching converter can be coupled to a current output terminal (e.g., the cathode) of the LED lamp, and an output terminal of the switching converter may be coupled to the negative output terminal of the AC-DC switching power supply. In this example, the input voltage signal of the switching converter can be a voltage signal at the cathode of the LED lamp, and a voltage signal at the anode of the LED lamp may be configured as the voltage signal. The voltage across the LED lamp can be controlled to be a DC value by controlling the input voltage signal of the switching converter to be equal to the AC components of the voltage signal.

Thus, the AC signal can be obtained by sampling the voltage signal and filtering the DC components of the voltage signal. The AC signal can be configured as the reference signal of the input voltage signal of the switching converter. Also, the switching converter may be controlled to perform energy storage and release operations based on an error compensation signal of the AC signal and the input voltage signal of the switching converter, in order to maintain the load current signal as a DC value. In particular embodiments a ripple suppression circuit can suppress the ripple components in the load current signal flowing through the load during the period of providing power to the load, in order to maintain the load current signal as a DC value.

Figure 2:
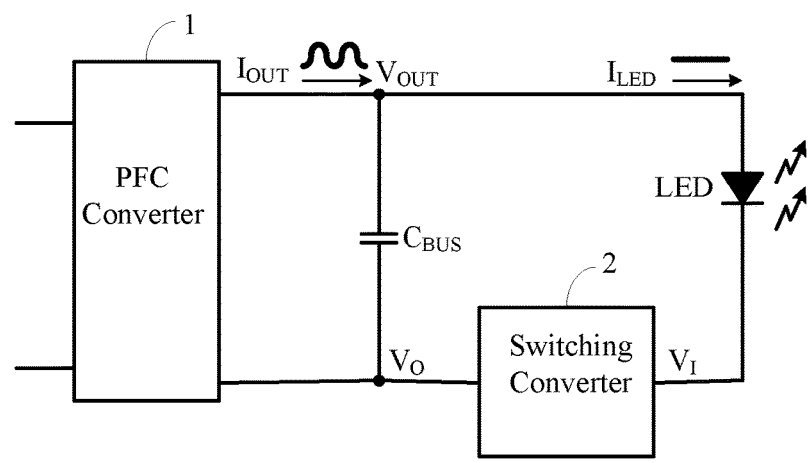
FIG. 2 is a schematic block diagram of an example load driving circuit, in accordance with embodiments of the present invention.

Referring now to FIG. 2, shown is a schematic block diagram of an example load driving circuit, in accordance with embodiments of the present invention. In this example, the source signal can be configured as an AC-DC switching power supply, and the load may be configured as an LED lamp. While this example AC-DC switching power supply only shows power factor correction (PFC) converter 1 and output capacitor $C_{BUS}$, a rectifier bridge can also be included in certain embodiments. An AC power signal may be rectified by the rectifier bridge, and then converted to voltage signal $V_{OUT}$ with ripple components by PFC converter 1 and output capacitor $C_{BUS}$. Output capacitor $C_{BUS}$ can connect in parallel with the PFC converter. The voltage across output capacitor $C_{BUS}$ may be configured as voltage signal $V_{OUT}$, and the PFC converter can generate current signal $I_{OUT}$. The positive terminal of output capacitor $C_{BUS}$ can be configured as the positive output terminal of the AC-DC switching power supply, and the negative terminal of output capacitor $C_{BUS}$ may be configured as the negative output terminal of the AC-DC switching power supply, where the voltage at the negative terminal can be lower than the voltage at the positive terminal of output capacitor $C_{BUS}$.

This example ripple suppression circuit can include switching converter 2 connected in series with the LED lamp between two output terminals of the AC-DC switching power supply. The difference voltage between input voltage signal $V_I$ and output voltage signal $V_O$ of switching converter 2 may be controlled to follow the variation of voltage signal $V_{OUT}$ (e.g., the voltage across the output capacitor $C_{BUS}$ generated by a signal source). Therefore, a load current signal $I_{LED}$ flowing through the LED lamp can be controlled to be a DC signal. In this example, switching converter 2 can connect between the negative terminal of output capacitor $C_{BUS}$ and the negative terminal of the LED lamp. Also, the input terminal of switching converter 2 can be configured to be the terminal coupled to the LED lamp, and the output terminal may be configured to be the terminal coupled to the output capacitor $C_{BUS}$. In other examples, switching converter 2 can be coupled between the positive terminal of output capacitor $C_{BUS}$ and the positive terminal of the LED lamp.

Figure 3:
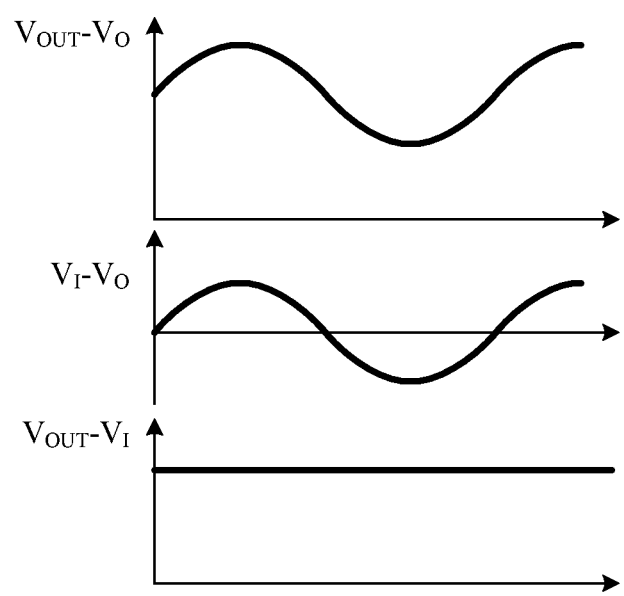
FIG. 3 is a waveform diagram of example operation of the load driving circuit of FIG. 2, in accordance with embodiments of the present invention.

Referring now to FIG. 3, shown is a waveform diagram of example operation of the load driving circuit of FIG. 2, in accordance with embodiments of the present invention. The former AC-DC switching power supply, switching converter 2, and the LED lamp may form a circuit loop, and the loop current can be configured as load current signal $I_{LED}$ flowing through the LED lamp. When the difference voltage $V_I$-$V_O$ between input voltage signal $V_I$ and output voltage signal $V_O$ of switching converter 2 follows the variation of voltage signal $V_{OUT}$ (e.g., when the difference voltage $V_I$-$V_O$ follows the voltage $V_{OUT}$-$V_O$ across output capacitor $C_{BUS}$), voltage $V_{OUT}$-$V_I$ across the LED lamp may be controlled to be a DC voltage in order to maintain the load current flowing through the LED lamp to be a DC current signal, so as to avoid flicker of the LED lamp. Furthermore, the positive value and negative value of the difference voltage $V_I$-$V_O$ can be configured to be offset to maintain the average value of difference voltage $V_I$-$V_O$ to be zero. Therefore, no power may be consumed by switching converter 2, and the average value of voltage signal $V_{OUT}$ may not be increased.

Switching converter 2 can include a power stage circuit and a control circuit. The power stage circuit can be controlled by the control circuit to store energy output by the AC-DC switching power supply when voltage signal $V_{OUT}$ is greater than a predetermined value. The power stage circuit can also be controlled to release energy to provide energy when voltage signal $V_{OUT}$ is not greater than the predetermined value, in order to power the LED lamp together with the AC-DC switching power supply. For example, the control circuit can determine the relationship between voltage signal $V_{OUT}$ and the predetermined value based on the load current signal. When load current signal $I_{LED}$ is greater than a reference current signal, this can indicate that voltage signal $V_{OUT}$ is greater than the predetermined value. The control circuit can control the output energy of the AC-DC switching power supply stored by the power stage circuit to vary with a difference between load current signal $I_{LED}$ and the reference current signal.

When load current signal $I_{LED}$ is not greater than the reference current signal, this can indicate that the voltage signal $V_{OUT}$ may not be greater than the predetermined value. The control circuit can control the energy released by the power stage circuit to vary with the difference between load current signal $I_{LED}$ and the reference current signal. Switching converter 2 may be configured as a converter to achieve both step-up and step-down functions because the positive value and negative value of the difference voltage between input voltage signal $V_I$ and output voltage signal $V_O$ may be offset. For example, the topology type of the switching converter 2 can be any suitable topology (e.g., buck-boost, flyback, SEPIC, etc.), or other available topologies with step-up and step-down functionality.

Figure 4:
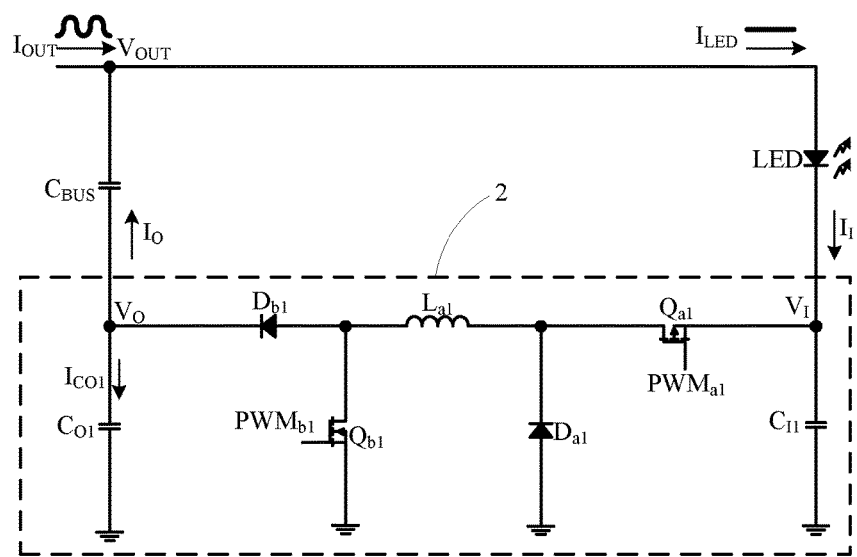
FIG. 4 is a schematic block diagram of an example load driving circuit, in accordance with embodiments of the present invention.

Referring now to FIG. 4, shown is a schematic block diagram of an example load driving circuit, in accordance with embodiments of the present invention. This example power stage circuit of switching converter 2 can be configured as a buck-boost topology, and can include transistor $Q_{a1}$ controlled by signal $PWM_{a1}$, transistor $Q_{b1}$ controlled by signal $PWM_{b1}$, inductor $L_{a1}$, capacitor $C_{I1}$, capacitor $C_{O1}$, rectifier diode $D_{a1}$, and rectifier diode $D_{b1}$. A first terminal of capacitor $C_{I1}$ can connect to ground, and a second terminal can connect to a cathode terminal of the LED lamp and may be configured as an input terminal of switching converter 2. Also, a voltage signal at the input terminal may be configured as input voltage signal $V_I$. A first terminal of transistor $Q_{a1}$ can connect to a second terminal of capacitor $C_{I1}$, and a second terminal of transistor $Q_{a1}$ can be coupled to an anode terminal of diode $D_{b1}$ through inductor $L_{a1}$. A cathode terminal of diode $D_{b1}$ can be coupled to a first terminal of capacitor $C_{O1}$ and the negative terminal of output capacitor $C_{BUS}$. A voltage at this common node may be configured as output voltage signal $V_O$ of switching converter 2.

A second terminal of capacitor $C_{O1}$ can connect to ground. Transistor $Q_{b1}$ may be coupled between anode terminal of diode $D_{b1}$ and ground. A cathode terminal of diode $D_{a1}$ can connect to a second terminal of transistor $Q_{a1}$, and an anode terminal can connect to ground. Switching converter 2 may have input current signal $I_1$ and output current signal $I_O$, and both of the current signals can equal to load driving signal $I_{LED}$. The capacitance value of capacitor $C_{I1}$ can be relatively low in order to filter switching current. The capacitance value of capacitor $C_{O1}$ may be relatively large in order to buffer the output power of the AC-DC switching power supply. Difference voltage $V_I$-$V_O$ between input voltage signal $V_I$ and output voltage signal $V_O$ can be controlled to follow $V_{OUT}$-$V_O$ by controlling the duty cycles of transistors $Q_{a1}$ and $Q_{b1}$. Thus, input voltage signal $V_I$ may follow the variation of voltage signal $V_{OUT}$. Difference voltage $V_{OUT}$-$V_I$ across the LED lamp may be controlled to be a DC voltage, and load current signal $I_{LED}$ can be obtained as a DC value in order to avoid flicker of the LED lamp. Since the value of $V_I$-$V_O$ may be switched between positive and negative, switching converter 2 may have two operation states.

In the first operation state, when $V_I$ is greater than $V_O$, the output energy of the former AC-DC switching power supply may be relatively large, so the voltage signal $V_{OUT}$ can be greater than the predetermined signal. Switching converter 2 may operate in a buck mode, thus extra energy output by the AC-DC switching power supply may be stored by capacitor $C_{O1}$. The extra energy refers to the energy other than for maintaining load current signal $I_{LED}$ to be the reference current signal. In one switching cycle, $I_{LED}=I_I=I_O=I_L \times D_1$, where $D_1$ refers to the duty cycle of transistor $Q_{a1}$, and $I_L$ refers to the current flowing through inductor $L_{a1}$. $I_{CO1}=I_L-I_O=I_L \times (1-D_1)$, where $I_{CO1}$ refers to the current flowing through capacitor $C_{O1}$.

In the second operation state, when $V_I$ is not greater than $V_O$, the output energy of the former AC-DC switching power supply may be relatively low, so voltage signal $V_{OUT}$ may not be greater than the predetermined signal. Switching converter 2 can operate in a boost mode, thus energy of switching converter 2 stored in capacitor $C_{O1}$ may be released to the LED lamp, so as to power the LED lamp together with the AC-DC switching power supply. In one switching cycle, $I_{LED}=I_f=I_O=I_L$, where $I_L$ refers to the current flowing through the inductor $L_{a1}$, and $I_{CO1}=I_L\times(1-D_2)=-I_L\times D_1$, where $I_{CO1}$ refers to the current flowing through capacitor $C_{O1}$, and $D_2$ refers to the duty cycle of transistor $Q_{b1}$.

The control circuit for controlling the power stage circuit to store and release energy can include an error compensation circuit for generating an error compensation signal of the reference current signal and load current signal $I_{LED}$. When the reference current signal is greater than load current signal $L_{LED}$, the increasing rate of the compensation signal may follow the variation of the difference between the reference current signal and the load current signal. The energy released from the power stage circuit to the LED lamp may be larger when the compensation signal becomes larger, and thus load current signal $I_{LED}$ can increase. When the reference current signal is not greater than load current signal $L_{LED}$, the decreasing rate of the compensation signal may follow the variation of the difference between load current signal $I_{LED}$ and the reference current signal. The output energy stored by the power stage circuit may be larger when the compensation signal becomes smaller, and thus load current signal $I_{LED}$ can decrease.

Figure 5:
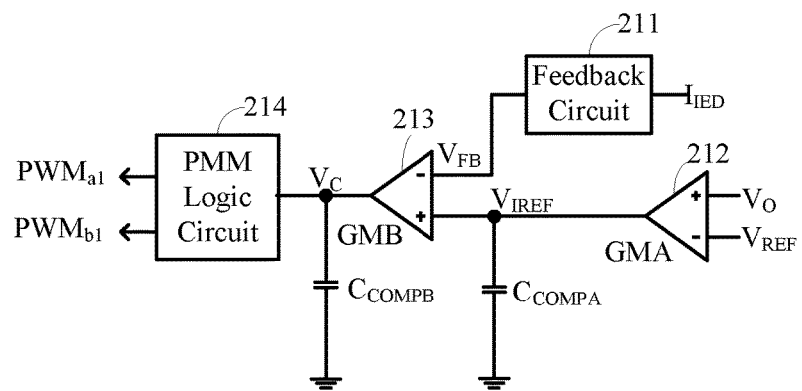
FIG. 5 is a schematic block diagram of an example control circuit for a ripple suppression circuit in the load driving circuit of FIG. 4, in accordance with embodiments of the present invention.

Referring now to FIG. 5, shown is a schematic block diagram of an example control circuit for a ripple suppression circuit in the load driving circuit of FIG. 4, in accordance with embodiments of the present invention. One compensation circuit can include feedback circuit 211, error amplifier 213, and compensation capacitor $C_{COMPB}$. Feedback circuit 211 can receive load current signal $I_{LED}$, and may generate feedback signal $V_{FB}$ of the load current signal. Error amplifier 213 (e.g., transconductance amplifier GMB) may have an inverting input that receives feedback signal $V_{FB}$, a non-inverting input terminal that receives representative signal $V_{IREF}$ that represents the reference current signal, and an output terminal that generates an error signal (e.g., a transconductance current generated by transconductance amplifier GMB). Compensation capacitor $C_{COMPB}$ can connect to an output terminal of error amplifier 213 for receiving the error signal, and generating compensation signal $V_c$.

Figure 6:
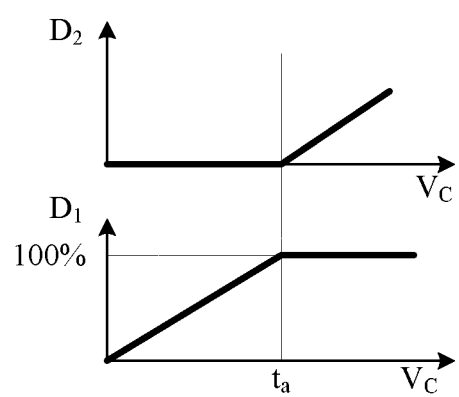
FIG. 6 is a waveform diagram of example operation of the control circuit of FIG. 5, in accordance with embodiments of the present invention.

Referring now to FIG. 6, shown is a waveform diagram of example operation of the control circuit of FIG. 5, in accordance with embodiments of the present invention. The control circuit can include PWM logic circuit 214 for generating signals $PWM_{a1}$ and $PWM_{b1}$ according to compensation signal $V_c$ to respectively control the switching states of transistors $Q_{a1}$ and $Q_{b1}$. The value of compensation signal $V_c$ at time $t_a$ can be an initial value. If the output energy of switching converter 2 is relatively large, load current signal $I_{LED}$ may be greater than the reference current, and compensation signal $V_c$ can decrease. The control circuit can control duty cycle $D_1$ of transistor $Q_{a1}$ to decrease along with compensation signal $V_c$. The switching converter may operate in the buck mode, and duty cycle $D_2$ of transistor $Q_{b1}$ can be maintained at zero, in order to store the extra energy of the AC-DC switching power supply. However, if the output energy of switching converter 2 is relatively small, load current signal $I_{LED}$ may not be greater than the reference current, and compensation signal $V_c$ can increase. The control circuit can control duty cycle $D_2$ of transistor $Q_{b1}$ to increase along with compensation signal $V_c$. The switching converter may operate in the boost mode, and can release energy to the LED lamp. In this way, the control circuit may maintain load current signal $I_{LED}$ to be the reference current signal by adjusting duty cycles $D_1$ and $D_2$ according to the compensation signal.

In order to make input voltage signal $V_I$ and output voltage signal $V_O$ have a certain voltage variation range to ensure that the voltage difference between $V_I$ and $V_O$ follows the variation of voltage signal $V_{OUT}$ having a larger variation in the ripple amplitude range, the control circuit may further include another error compensation circuit for generating the representative signal. When a first voltage signal is greater than a reference voltage signal, the increasing rate of the representative signal may follow the difference between voltage signal $V_1$ and the reference voltage signal. When the first voltage signal is not greater than the reference voltage signal, the decreasing rate of the representative signal can follow the difference between the reference voltage signal and the first voltage signal. In this example, the first voltage signal can be one of the input voltage signal and the output voltage signal of switching converter 2.

For example, this additional error compensation circuit in FIG. 5 can include error amplifier 212 and compensation capacitor $C_{COMPA}$. Error amplifier 212 can be transconductance amplifier GMA having an inverting input terminal that receives reference voltage signal $V_{REF}$, a non-inverting input terminal that receives output voltage signal $V_O$ (or the input voltage signal $V_I$ in some other examples), and an output terminal that generates an error signal (e.g., a transconductance current of transconductance amplifier $C_{COMPA}$). Compensation capacitor $C_{COMPA}$ may be coupled to the output terminal of error amplifier 212 for receiving this error signal, and may generate representative signal $V_{IRFF}$. The ratio of the representative signal $V_{IREF}$ and the reference current signal may be equal to the ratio of the feedback signal and load current signal $I_{LED}$.

Thus, the control circuit of FIG. 5 can include two control loops: a fast loop formed by error amplifier 213, and a slow loop formed by error amplifier 212. For an outer loop, when output voltage signal $V_O$ is greater than reference voltage signal $V_{REF}$, this can indicate that too much energy may be stored in switching converter 2. The average value of load current signal $I_{LED}$ may not be greater than current $I_{OUT}$ provided by the former AC-DC switching power supply, and representative signal $V_{IREF}$ may be adjusted to increase, such that switching converter 2 may operate in the boost mode for more time, and may otherwise operate in the buck mode for more time, in order to maintain output voltage signal $V_O$ be reference voltage signal $V_{REF}$. For the fast loop, the error between feedback signal $V_{FB}$ and representative signal $V_{IREF}$ can be continuously calculated to generate compensation signal $V_c$ for controlling duty cycles $D_1$ and $D_2$, such that switching converter 2 may be able to maintain load current signal $I_{LED}$ be a DC value.

Figure 7:
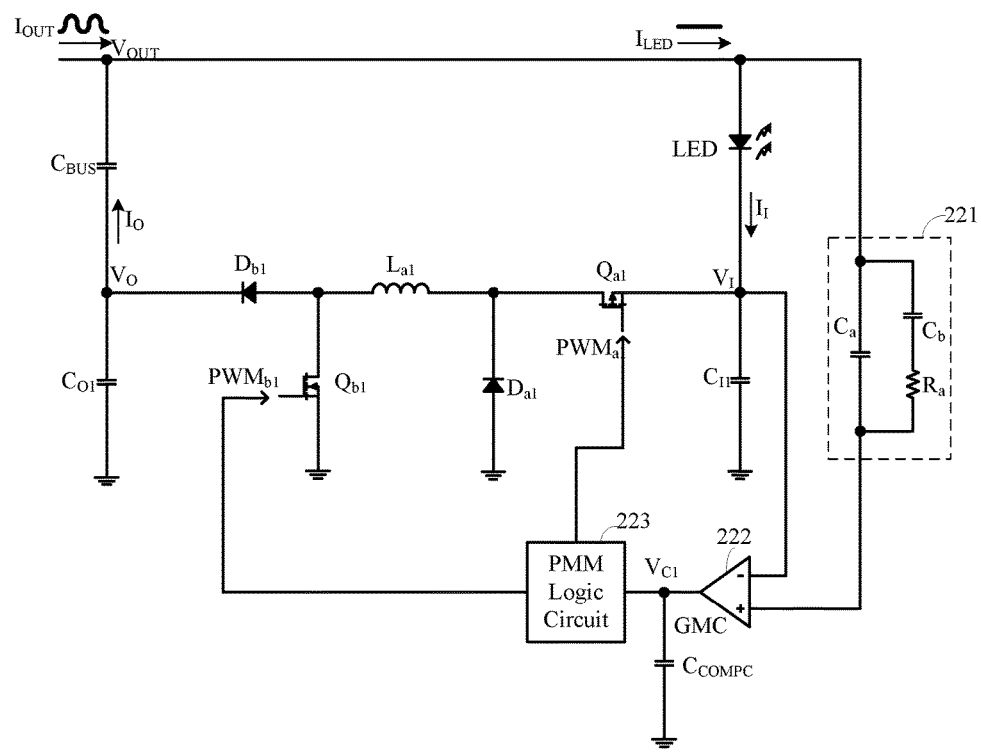
FIG. 7 is a schematic block diagram of an example load driving circuit with a ripple suppression circuit of voltage control mode, in accordance with embodiments of the present invention.

Referring now to FIG. 7, shown is a schematic block diagram of an example load driving circuit with a ripple suppression circuit of voltage control mode, in accordance with embodiments of the present invention. The control circuit in FIG. 5 can control the switching converter in a current sampling manner. However, in this case, the approach of controlling the difference between input voltage signal $V_I$ and output voltage signal $V_O$ of switching converter 2 to follow reference signal $V_{OUT}$ may not be limited to the examples as described above. For example, a voltage sampling manner can also be employed as in FIG. 7. In this particular example, the control circuit can include filter circuit 221, error compensation circuit 222, and PWM logic circuit 223. Filter circuit 221 can receive voltage signal $V_{OUT}$, and may filter the DC components of voltage signal $V_{OUT}$ to generate an AC signal. Error compensation circuit 222 can generate compensation signal $V_{C1}$ based on the error between the AC signal and the input voltage signal of the switching converter.

The PWM logic circuit can generate signals $PWM_{a1}$ and $PWM_{b1}$ according to compensation signal Vci to control the switching operations of transistors $Q_{a1}$ and $Q_{b1}$, such that the power stage circuit in the switching converter performs energy storage and release operations. This can control the input voltage signal of the switching converter to follow the variation of the AC signal, in order to maintain the load current signal $I_{LED}$ be a DC value. In addition to a suppression circuit formed by a switching converter of the buck-boost topology, load driving circuits with ripple suppression circuits implemented by other topologies may also be supported in particular embodiments, as described in the following examples.

Figure 8:
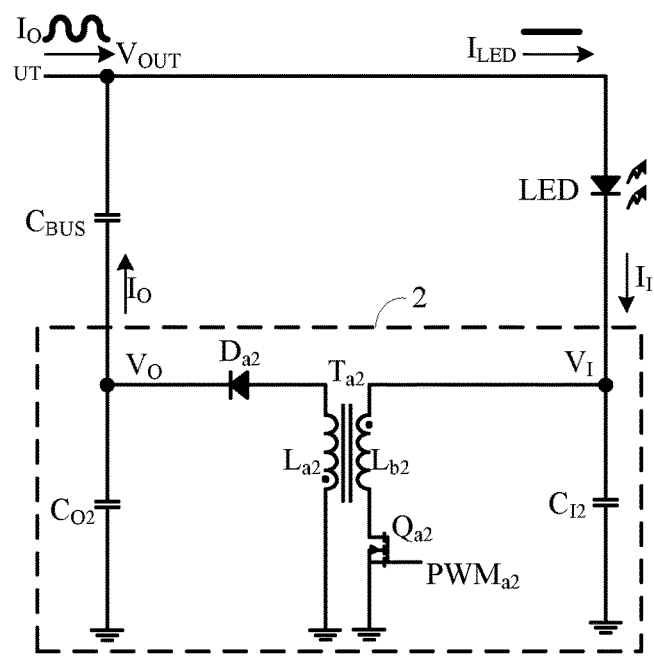
FIG. 8 is a schematic block diagram of another example load driving circuit, in accordance with embodiments of the present invention.

Referring now to FIG. 8, shown is a schematic block diagram of another example load driving circuit, in accordance with embodiments of the present invention. In this example, the power stage circuit of switching converter 2 can be a flyback topology, and can include capacitor $C_{I2}$, capacitor $C_{O2}$, transistor $Q_{a1}$, rectifier diode $D_{a2}$, and transformer $T_{a2}$. For example, capacitor $C_{I2}$ may have a first terminal coupled to the cathode of the LED lamp, and a second terminal being coupled to ground. Capacitor $C_{O2}$ may have a first terminal being coupled to the negative terminal of output capacitor $C_{BUS}$, and a second terminal coupled to ground. Diode $D_{a2}$ may have a cathode being coupled to the first terminal of the capacitor $C_{O2}$, and an anode coupled to the first terminal of secondary winding $L_{a2}$ of transformer $T^{a2}$. The second terminal of secondary winding $L_{a2}$ may be coupled to ground. The first terminal of the primary winding $L_{b2}$ of transformer $T_a$ can be coupled to ground through transistor $Q_{a2}$, and the second terminal may be coupled to the first terminal of capacitor $C_{I2}$. The duty cycle of transistor $Q_{a2}$ can be controlled by signal $PWM_{a2}$, such that capacitor $C_{O2}$ performs energy storage and release operations. The difference between input voltage signal $V_I$ and the output voltage signal $V_O$ of switching converter 2 can follow the variation of voltage signal $V_{OUT}$, and load current signal $I_{LED}$ may be adjusted to be a DC value.

Figure 9:
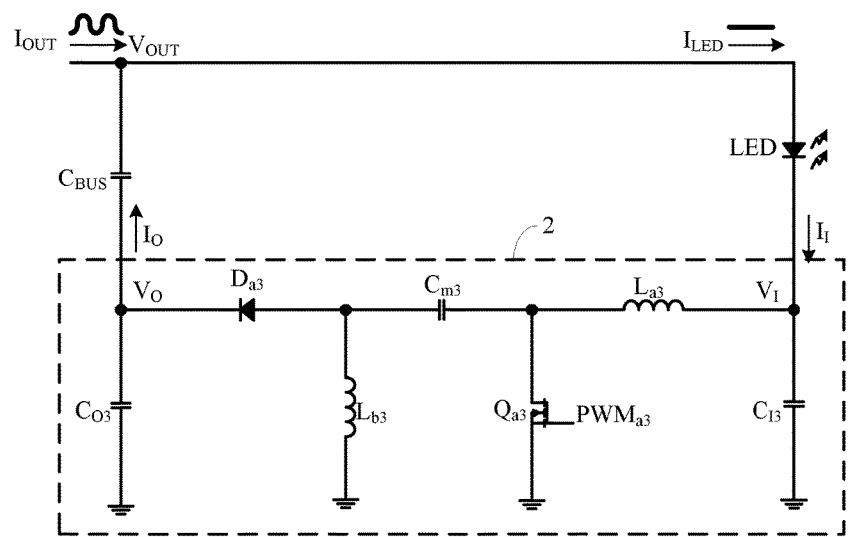
FIG. 9 is a schematic block diagram of another example load driving circuit, in accordance with embodiments of the present invention.

Referring now to FIG. 9, shown is a schematic block diagram of another example load driving circuit, in accordance with embodiments of the present invention. In this example, the power stage circuit of switching converter 2 can be a SEPIC topology, and can include transistor $Q_{a3}$ being controlled by signal $PWM_{a3}$, capacitor $C_{m3}$, inductor $L_{a3}$, inductor $L_{b3}$, capacitor $C_{I3}$, capacitor $C_{O3}$ and rectifier diode $D_{a3}$. Capacitor $C_{I3}$ may have a first terminal coupled to ground and a second terminal coupled to a cathode of the LED lamp. Inductor $L_{a3}$ may have a first terminal coupled to the second terminal of capacitor $C_{I3}$, and a second terminal coupled to ground through transistor $Q_{a3}$. Capacitor $C_{m3}$ may have a first terminal coupled to a second terminal of inductor $L_{a3}$, and a second terminal coupled to ground through inductor $L_{b3}$. Diode $D_{a3}$ may have an anode coupled to a second terminal of capacitor $C_{m3}$, and a cathode coupled to a first terminal of capacitor $C_{O3}$ and the negative terminal of output capacitor $C_{BUS}$. A second terminal of capacitor $C_{O3}$ may be coupled to ground. The duty cycle of transistor $Q_{a3}$ can be controlled by signal $PWM_{a3}$, such that capacitor $C_{O3}$ performs energy storage and release operations. The difference between input voltage signal $V_I$ and output voltage signal $V_O$ of switching converter 2 can follow the variation of voltage signal $V_{OUT}$, and load current signal $I_{LED}$ may be adjusted to be a DC value.

Figure 10:
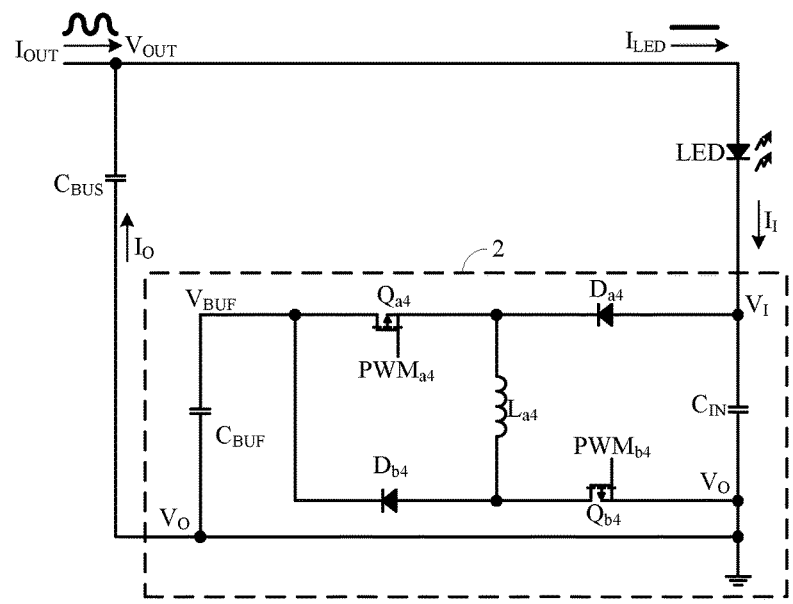
FIG. 10 is a schematic block diagram of yet another example load driving circuit, in accordance with embodiments of the present invention.

Referring now to FIG. 10, shown is a schematic block diagram of yet another example load driving circuit, in accordance with embodiments of the present invention. In this example, the power stage circuit of switching converter 2 can include transistor $Q_{a4}$, transistor $Q_{b4}$, inductor $L_{a4}$, capacitor $C_{IN}$, capacitor $C_{BUF}$, diode $D_{a4}$, and diode $D_{b4}$. Capacitor $C_{IN}$ may have a first terminal coupled to a current output terminal of the LED lamp, and a second terminal coupled to the negative terminal of output capacitor $C_{BUS}$. For example, both of the second terminal and the negative terminal can be grounded. Diode $D_{a4}$ may have a current input terminal coupled to a first terminal of the capacitor $C_{IN}$, and a current output terminal coupled to a first terminal of inductor $L_{a4}$. A second terminal of inductor $L_{a4}$ can be coupled to the second terminal of capacitor $C_{IN}$ through transistor $Q_{b4}$.

Capacitor $C_{BUF}$ may have a first terminal coupled to the second terminal of capacitor $C_{IN}$, and a second terminal coupled to the first terminal of inductor $L_{a4}$ through the transistor $Q_{a4}$. Diode $D_{b4}$ may have a current input terminal coupled to a second terminal of inductor $L_{a4}$, and a current output terminal coupled to the second terminal of capacitor $C_{BUF}$. The duty cycle of transistor $Q_{a4}$ may be controlled by signal $PWM_{a4}$, such that capacitor $C_{BUF}$ performs energy storage and release operations. The difference between input voltage signal $V_I$ and the output voltage signal $V_O$ of switching converter 2 may follow the variation of voltage signal $V_{OUT}$, and load current signal $I_{LED}$ can be adjusted to be a DC value. It should be noted that as described herein, if signal "A" follows signal "B," this means that signals A and B are changed synchronously (i.e., B increases when A increases, and B decreases when A decreases).

In particular embodiments, a ripple suppression circuit can utilize a switching converter to buffer the output energy of the former signal source, such that the difference voltage between the input voltage signal and the output voltage signal of the switching converter can follow the variation of the voltage signal generated by the signal source. This can suppress the ripple on the load and maintain the load current signal be a DC value, and may also substantially avoid flicker of the LED lamp caused by the ripple components that may be found in the load current signal. Since the average value of the difference voltage between the input voltage signal and the output voltage signal of the switching converter can be zero, the switching converter may not consume extra power generated by the signal source. Therefore, the power consumption of the load driving circuit with a ripple suppression circuit can be substantially low.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A method of suppressing ripple, the method comprising:
   a) coupling a switching converter and a load in series between output terminals of a signal source;
   b) controlling a difference voltage between an input voltage signal and an output voltage signal of said switching converter to vary with a voltage signal generated by said signal source to maintain a load current signal flowing through said load as a DC signal; and
   c) controlling an average value of said difference voltage to be zero.

2. The method of claim 1, wherein the controlling said difference voltage to vary with said voltage signal generated by said signal source comprises:
   a) controlling said switching converter to store a portion of output energy of said source signal when said voltage signal is greater than a predetermined signal; and
   b) controlling said switching converter to release energy when said voltage signal is not greater than said predetermined signal, in order to provide energy to said load together with said source signal.

3. The method of claim 2, wherein:
   a) when said load current signal is greater than a reference current signal, and said voltage signal is greater than said predetermined signal, the energy stored by said switching converter is controlled to vary with a difference between said reference current signal and said load current signal; and
   b) when said load current signal is not greater than said reference current signal, and said voltage signal is not greater than said predetermined signal, said energy released by said switching converter is controlled to vary with said difference between said reference current signal and said load current signal.

4. The method of claim 3, wherein:
   a) when a first voltage signal is greater than a reference voltage signal, the increasing rate of said reference current signal is controlled to vary with a difference between said first voltage signal and said reference voltage signal;
   b) when said first voltage signal is not greater than said reference voltage signal, the decreasing rate of said reference current signal is controlled to vary with said difference between said first voltage signal and said reference voltage signal; and
   c) said first voltage signal is configured as said input voltage signal or said output voltage signal of said switching converter.

5. The method of claim 2, wherein an input terminal of said switching converter is coupled to a current output terminal of said load, and an output terminal of said switching converter is coupled to a negative output terminal of said signal source.

6. The method of claim 5, further comprising:
   a) filtering DC components in said voltage signal to obtain an AC signal, wherein said AC signal is configured as a reference signal of said input voltage signal of said switching converter; and
   b) controlling said switching converter to perform energy storage and release operations based on an error compensation signal between said AC signal and said input voltage signal of said switching converter.

7. The method of claim 2, wherein a value of said predetermined signal is equal to said average value of said voltage signal.

8. A ripple suppression circuit, comprising:
   a) a switching converter coupled in series with a load between output terminals of a signal source; and
   b) wherein a difference voltage between an input voltage signal and an output voltage signal of said switching converter follows the variation of a voltage signal generated by said signal source, in order to maintain a load current signal of said load as a DC value, wherein an average value of said difference voltage is zero.

9. The ripple suppression circuit of claim 8, wherein said switching converter comprises:
   a) a power stage circuit and a control circuit; and
   b) wherein said control circuit controls said power stage circuit to store a portion of output energy of said signal source when said voltage signal is greater than a predetermined signal, and to release energy when said voltage signal is not greater than said predetermined signal, in order to supply power to said load together with said signal source.

10. The ripple suppression circuit of claim 9, wherein:
    a) when said load current signal is greater than a reference current signal, and said voltage signal is greater than said predetermined signal, said control circuit is configured to control said output energy stored by said power stage circuit to follow the variation of a difference between said load current signal and said reference current signal; and
    b) when said load current signal is not greater than said reference current signal, and said voltage signal is not greater than said predetermined signal, said control circuit is configured to control said energy released by said power stage circuit to follow the variation of said reference current signal and said load current signal.

11. The ripple suppression circuit of claim 10, wherein said control circuit comprises:
    a) a first error compensation circuit for generating a compensation signal based on said difference between said reference current signal and said load current signal;
    b) wherein when said reference current signal is greater than said load current signal, the increasing rate of said compensation signal follows the variation of said difference between said reference current signal and said load current signal, said compensation signal increases, and said energy released from said power stage circuit to said load increases, in order to increase said load current signal; and
    c) wherein when said reference current signal is not greater than said load current signal, the decreasing rate of said compensation signal follows the variation of said difference between said reference current signal and said load current signal, said compensation signal decreases, and said energy stored by said power stage circuit increases, in order to decrease said load current signal.

12. The ripple suppression circuit of claim 11, wherein said first error compensation circuit comprises:
    a) a feedback circuit configured to receive said load current signal, and to generate a feedback signal of said load current signal;
    b) a first error amplifier having a first input terminal for receiving said feedback signal, a second input terminal for receiving a representative signal of said reference current signal, and an output terminal for generating a first error signal; and
    c) a first compensation capacitor coupled to an output terminal of said first error amplifier for receiving said first error signal and generating said compensation signal.

13. The ripple suppression circuit of claim 12, wherein said control circuit further comprises:
    a) a second error compensation circuit for generating said representative signal;
    b) wherein when a first voltage signal is greater than a reference voltage signal, an increasing rate of said representative signal follows the variation of a difference between said first voltage signal and said reference voltage signal; and c) wherein when a first voltage signal is not greater than a reference voltage signal, a decreasing rate of said representative signal follows the variation of a difference between said first voltage signal and said reference voltage signal, wherein said first voltage signal is said input voltage signal or said output voltage signal of said switching converter.

14. The ripple suppression circuit of claim 10, wherein a value of said predetermined signal equals an average value of said voltage signal.

15. The ripple suppression circuit of claim 9, wherein said input terminal of said switching converter is coupled to a current output terminal of said load, and said output terminal of said switching converter is coupled to a negative output terminal of said signal source.

16. The ripple suppression circuit of claim 15, wherein said control circuit comprises:
   a) a filter circuit configured to receive said voltage signal for filtering DC components in said voltage signal, and to generate an AC signal; and
   b) a third error compensation circuit configured to generate a compensation signal based on said difference between said AC signal and said input voltage signal of said switching converter;
   c) said control circuit being configured to control said power stage circuit to perform energy storage and release operations according to said compensation signal, in order to control said input voltage signal of said switching converter to follow the variation of said AC signal, and to maintain said load current signal as a DC value.

17. The ripple suppression circuit of claim 9, wherein said power stage circuit comprises:
   a) a first capacitor having a first terminal coupled to said current output terminal of said load, and a second terminal coupled to said negative output terminal of said signal source;
   b) a first rectifier diode having a current input terminal coupled to said first terminal of said first capacitor, and a current output terminal coupled to a first terminal of an inductor;
   c) a second terminal of said inductor being coupled to said second terminal of said first capacitor through a first transistor;
   d) a second capacitor having a first terminal coupled to said second terminal of said first capacitor, and a second terminal coupled to said first terminal of said inductor through said second transistor; and
   e) a second diode having a current input terminal coupled to said second terminal of said inductor, and a current output terminal coupled to said second terminal of said second capacitor.

18. A load driving circuit comprising the ripple suppression circuit of claim 8, wherein:
   a) said ripple suppression circuit is coupled in series with a load between output terminals of a signal source; and
   b) said signal source outputs a voltage signal to said load, said ripple suppression circuit is used to eliminate ripple components on said load, and to maintain a load current signal flowing through said load as a DC value.

19. The load driving circuit of claim 18, wherein said signal source comprises:
   a) a power factor correction (PFC) converter and an output capacitor; and
   b) said output capacitor having a positive terminal coupled to an output terminal of said PFC converter, and a negative terminal coupled to a negative output terminal of said signal source.

* * * * *